Figure 4:
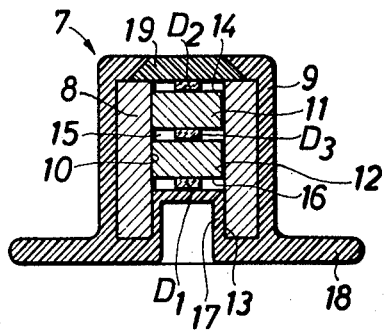

United States Patent
Burgkhardt et al.

[11] 3,932,758
[45] Jan. 13, 1976

[54] METHOD AND APPARATUS FOR DETERMINING THE DOSE VALUE OF NEUTRONS

[75] Inventors: Bertram Burgkhardt, Karlsruhe; Ernst Piesch, Leopoldshafen, both of Germany

[73] Assignee: Gesellschaft fur Kernforschung m.b.H., Karlsruhe, Germany

[22] Filed: Dec. 4, 1973

[21] Appl. No.: 421,648

[30] Foreign Application Priority Data
Dec. 8, 1972   Germany............................ 2260094

[52] U.S. Cl. ................. 250/390; 250/391; 250/484
[51] Int. Cl. ........................... G01t 3/00; G01t 1/11
[58] Field of Search .......... 250/390, 391, 392, 472, 250/473, 484

[56] References Cited
UNITED STATES PATENTS
3,290,500   12/1966   Bokhari et al. ..................... 250/391
3,792,280   2/1974   Piltingsrud .......................... 250/390

Primary Examiner—Archie R. Borchelt
Attorney, Agent, or Firm—Spencer & Kaye

[57] ABSTRACT

A method is provided for determining the dose value of neutrons leaving a body as thermal and intermediate neutrons after having been scattered in the body. A first dose value of thermal and intermediate neutrons are detected on the surface of the body by means of a first detector for neutrons which is shielded against thermal and intermediate neutrons not emerging from the body. A second detector is used to measure a second dose value of the thermal and intermediate neutrons not emerging from the body. A first correction factor based on the first and second values is obtained from a calibration diagram and is applied to the first dose value to determine a first corrected first dose value.

21 Claims, 6 Drawing Figures

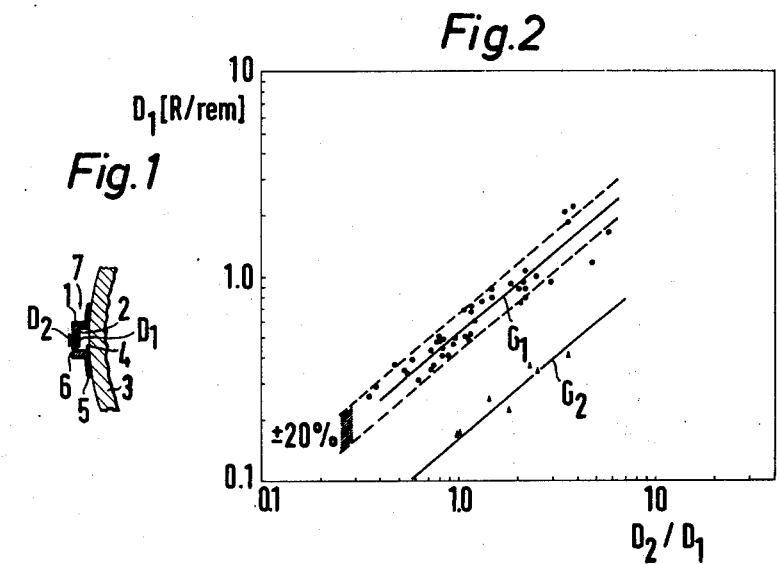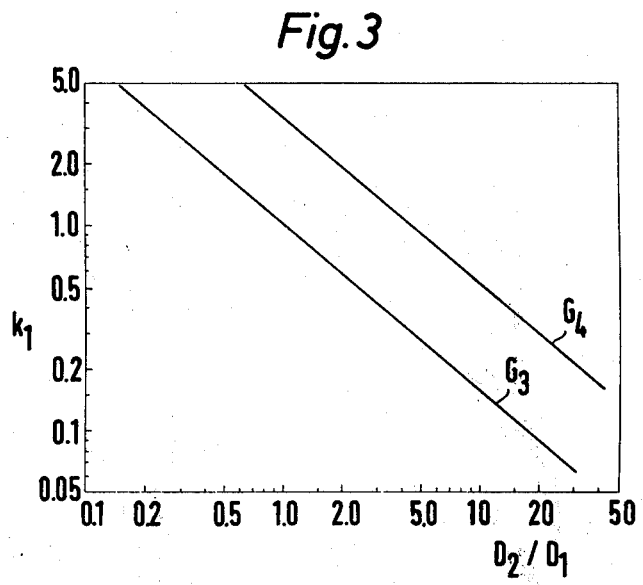

METHOD AND APPARATUS FOR DETERMINING THE DOSE VALUE OF NEUTRONS

The present invention relates to a method of determining the dose value of neutrons leaving a body as thermal and intermediate neutrons after having been scattered in it and detected on the surface of the body by means of a detector for neutrons which is shielded against the thermal and intermediate neutrons not leaving the body.

This method of measurement, which is also called albedo dosimetry, is based on the principle that high-energy neutrons leave a body as thermal and intermediate neutrons after having been scattered in it and are detected on the surface of the body by means of a detector for thermal neutrons. From theoretical and experimental studies the albedo factor for thermal neutrons, defined as the thermal neutron fluence scattered by the body relative to the total neutron fluence entering the body, shows an over-sensitivity of up to a factor of 4 to directly incident thermal neutrons as against intermediate neutrons. When using a cadmium or boron shield, albedo dosimeters do furnish an approximately equivalent-dose correct reading of thermal and intermediate neutrons up to energies of 10 keV, but albedo dosimeters will be able to detect fast neutrons only with a low sensitivity corresponding to some 1–5% of the sensitivity to intermediate neutrons. Hence, it is not meaningful in the opinion of experts to use this type of detectors for the detection of fast neutrons.

On the other hand, it is known that fast neutrons can be detected by nuclear emulsions allowing a measurement to be made of the equivalent dose in the energy range between 0.6 and 5 MeV within ±60% (Atompraxis, 9, p. 179, 1963). However, the high gamma sensitivity, the small range of measurement and the fading, especially at low neutron energies, very much reduce the applicability of this kind of personnel monitoring system.

Non-photographic nuclear track detectors are now increasingly being introduced in routine monitoring surveys. The wide dose range together with optimum gamma discrimination, on the one hand, and the relatively high gamma background of thick layers of fissile material (U, Th, Np) and the insufficient sensitivity of these detectors with thin detectors layers, on the other hand, indicate the advantages especially in accident dosimetry. One major disadvantage of nuclear track detectors, however, is the energy threshold, which would allow only fast neutrons above 0.7 MeV to be detected, if at all. With albedo dosimeters, however, due to the detection of low-energy neutrons backscattered by the body, this energy threshold does not exist. This method of neutron detection therefore has been preferred for the detection of thermal and intermediate neutrons (Dennis, I. A. et al., Proc. IAEA Scint., Neutron Monitoring, Vienna 1967, p. 547). It has been found that cadmium covered films and nuclear track emulsions under certain conditions may also detect thermal and intermediate neutrons.

An albedo dosimeter has also been developed (Korba, A., Hoy, J. E., Health Physics 18, p. 581, 1970) which consists of a combination of two LiF dosimeter pairs arranged within a polyethylene hemisphere partly covered with Cd. This dosimeter is able to measure the equivalent dose of neutrons of a $^{252}$Cf and Pu-Be source and neutrons of various critical assemblies. However, if the radiation field, scattered or unscattered neutrons, is known, as in the range of intermediate neutrons close to reactors, the equivalent dose can be determined with sufficient accuracy only by means of a location dependent calibration factor.

Further reasons for difficulties involved in the measurement of fast neutrons are caused by the fact that studies conducted with $^{252}$Cf neutrons indicated that the influence of scattered neutrons from the environment is relatively small in the case of open air exposure, but that these detection conditions change as the fraction of neutrons backscattered by the ground, the wall and the shielding of the source, respectively, increases.

Now, it is the purpose of the present invention to create a light-weight and simply designed albedo dosimeter for measuring the equivalent dose of fast neutrons which requires no additional information about the radiation conditions encountered on the spot and which indicates the equivalent dose almost independent of the neutron energy and the direction of radiation incidence even in the presence of a continuous spectrum.

One possible solution to this problem consists in the fact that another detector is used to measure another dose value of the thermal and intermediate neutrons not leaving the body, the two dose values are coupled, a first correction factor is taken from a calibration diagram, and that the correct dose value is calculated from the dose value of the first detector. In this case, the first correction factor for the first does value can be determined as a function of the quotient of the two dose values.

Another possible solution of the problem is characterized in that a second detector is used to measure a second dose value of the thermal and intermediate neutrons not leaving the body, the second and the first dose value are coupled, and a first correction factor is taken from a first calibration diagram, that a third dose value is measured by a third detector completely shielded against thermal neutrons, that this dose value and the second dose value are coupled and that a second correction factor is taken from a second calibration diagram corresponding to the first calibration diagram and that in this way the correct dose value is calculated from the dose value of the first detector. In this case, the first correction factor may be determined as a function of the quotient of the first and second dose values and the second correction factor may be determined as a function of the quotient of the difference of two of the dose values and one of the dose values. In one embodiment, the second correction factor can be determined as a function of the quotient of the difference of the second and third dose values and the third dose value.

A possible device for the execution of the first possible method is characterized in that the first detector is arranged on the inner bottom of pan-shaped form whose opening can be placed upon the body and that the second detector is arranged on the outer bottom of the form. The form may have an edge resting upon the body, the form and the edge themselves being made of a material absorbing thermal and intermediate neutrons.

One device for the execution of another possible method is characterized in that the interior of a cylinder, whose bottom opening faces towards the body, contains two disks arranged at a certain distance from each other so as to form two cross sectional planes, the outer surface of one disk carrying the second detector, the space between the two disks holding the third detector and the outer surface of the second disk, which is close to the bottom opening of the cylinder, carrying the first detector and the cylinder and the second disk constituting a pan-shaped form. The cylinder and the outer surface of the first disk and the inner space of the pan-shaped form may be surrounded by and lined with a plastic form. In one embodiment the plastic form at the level of the bottom opening of the cylinder may have a support edge surrounding said cylinder. In a preferred embodiment, the cylinder and the disks are made of a material absorbing thermal and intermediate neutrons, such as boron or a material containing boron.

According to the present invention it is ensured in this way that the relatively high sensitivity to backscattered neutrons of the albedo dosimeter is reduced so that an equivalent dose correct reading can be obtained.

In the first possible method, this is achieved by covering the dosimeter pair with a boron capsule on the side facing away from the body so as to absorb incident neutrons and by separate measurement of the incident neutrons and the neutrons backscattered by the body by one dosimeter each on both sides of the boron encapsulation. The ratio of readings of the two dose values is used to determine a frst correction factor. In addition, it is possible by measuring the dose both on the front and the back of the body by means of one dosimeter each to reduce the directionality of the dosimeter reading. In this "albedo dosimeter system" the readings of both dosimeters are added and assigned their first correction factor which is determined from the corresponding ratio of readings.

As has been shown by results of measurements, these measures were sufficient to reduce the dependence on energy and direction of the dosimeter reading for measurement of the equivalent dose of fast neutrons in the range of energy between some 100 keV and 14 MeV. In the other possible method, a corresponding procedure is adopted. The present invention is explained in greater detail below by examples on the basis of FIG. 1-6.

In a preferred embodiment the detectors used are pressed LiF-dosimeters of $3 \times 3 \times 1$ mm$^3$ size which can be obtained commercially as TLD 600 and TLD 700 dosimeters. The detectors were calibrated with a $^{137}$Cs radiation. The maximum annealing temperature during the measurement is 240°C. In order to allow the detectors, hereinafter called dosimeters for short, to be re-used, regeneration was performed at a temperature of 400°C (1 h) and 100°C (2 h). Because of non-uniform sensitivities of the single dosimeters differing by more than ±5% within a batch, each dosimeter was calibrated individually before the beginning of the series of measurements. Moreover, it was ensured that the individual calibration factor is not changed by regeneration.

One TLD 600/TLD 700 dosimeter pair and detector pair, respectively, each was used for separation of the gamma dose fraction. The TLD 700 dosimeter is regarded as being sufficiently insensitive to thermal neutrons for the measurements anticipated. Its reading is a measure of the gamma dose. By contrast, TLD 600 besides the gamma radiation also indicates thermal neutrons, because of its high $^6$Li-content. The difference in readings between TLD 600 and TLD 700 indicates the neutron fraction of the radiation.

Both TLD 600 and TLD 700 show a similar supralinear behavior to gamma radiation above 200 rem. In this case, the fraction of the reading simulated as a neutron fraction in difference formation by the small differences in the gamma sensitivities of TLD 600 and TLD 700 is less than 10% for gamma doses up to 1000 rem and less than 20% of the measured gamma dose up to 10$^5$ rem.

The difference in readings between TLD 600 and TLD 700 is proportional to the equivalent dose for neutrons in the dose range between 20 rem and 1000 rem and above this dose shows a more favorable supralinear behavior in contrast to the gamma dose reading. After correction of the supralinear reading of the difference in measured values by a maximum factor of 1.75 it is possible to extend the neutron dose range up to 10$^5$ rem. Gamma and neutron dose fractions can be separated as long as either of the two dose fractions contributes at least 10% to the total dose. The albedo dosimeter containing TLD 600 and TLD 700 as the detectors accordingly is able to detect fast neutrons, for instance of a $^{252}$Cf source, over a dose range between 20 mrem and 10$^5$ rem. Of course, given the right calibration, also the energy dose can be measured instead of the equivalent dose.

A detector system of this type according to the present invention is outlined in greater detail below by means of FIG. 1.

As a shield against incident scattered neutrons a familiar pan-shaped form 1 was used as a boron capsule which represents an optimization of the capsule size (dia. 48 mm) and the depth of the first detector $D_1$ on the inner bottom 2 in capsule 1 (9 mm) with respect to discrimination of the neutrons incident from the body 3. The wall thickness is 3 mm and corresponds to an attenuation factor of 1000 for thermal neutrons. The opening 4 rests upon the body 3, as does an edge 5 surrounding it to shield against neutrons incident from the side.

Figure 5:
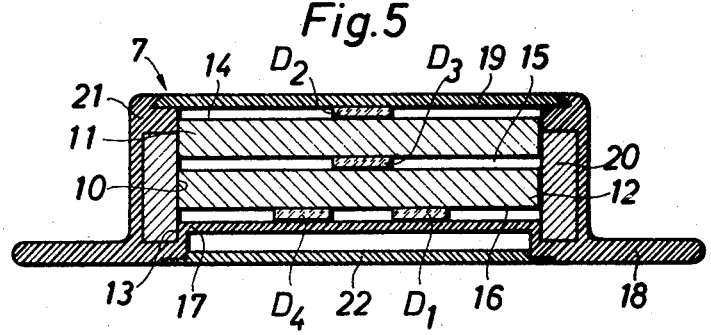
Figure 6:
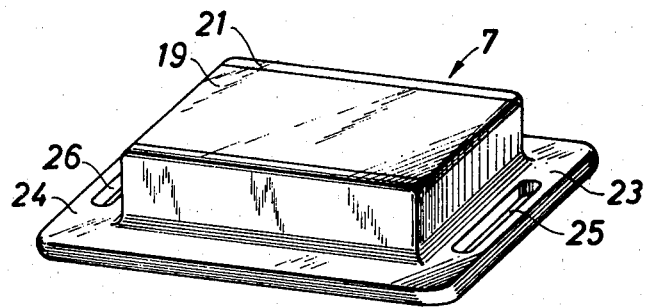

The second detector $D_2$ freely rests on the outside bottom 6 of the form and capsule 1, respectively (incidentally, it is possible to use for each detector $D_1$, $D_2$ and detector $D_3$ in FIG. 4–6 two LiF ($^6$Li, $^7$Li) platelets each positioned side by side).

This detector $D_2$ is used to measure the neutron fraction scattered by the environment (intermediate and thermal neutrons) without absorption.

The reading of this albedo dosimeter 7 on the surface of the phantom 3 was referred to the equivalent dose which was ascertained in the same place by means of a rem-counter. Calibration with 14 MeV neutrons and thermal neutrons was done by means of additional activation and fission detectors (neptunium, sulfur, gold).

For calibration of the albedo dosimeter 7 in the range of fast neutrons a 1 mg $^{252}$Cf source with an effective source flux of $2.1 \times 10^9$ n/sec was used together with a 10 Ci $^{238}$Pu-Be source. Exposures were made at 1.4 m height above ground (concrete) in a hall of $10 \times 20$ m$^2$ size and 10 m height and at distances of 5, 3, 2, 1 and 0.5 m from the source. Exposures to the $^{252}$Cf source were made in the open air and behind various shieldings. The materials selected for the 5 cm thick shield were PVC, concrete aluminum, and iron.

The influence of the neutrons backscattered from the ground for source distances between 0.5 and 5 m and the change in energy distribution caused by the source being shielded on all sides resulted in a dose reading which was proportional to the equivalent dose within ± 30% for the three directions of radiation incidence selected under 0°, 90°, and 180°. The mean detection sensitivity of the albedo dosimeter systen 7 is 0.54 R/rem for the neutron spectra at hand. Open air exposure without any shielding resulted in a sensitivity of 0.4 R/rem for $^{252}$Cf neutrons, the corresponding value being 0.3 R/rem for Pu-Be neutrons and 0.71 R/rem for 14 MeV neutrons.

The additional detection of neutrons backscattered from the environment changes the relative dosimeter sensitivity of the albedo dosimeter 7 by a factor of up to 4. Hence, a dose measurement is possible only by additional correction of the neutrons incident from the outside, e.g. by separate measurement of the incident and the backscattered neutrons, for instance, through the ratio of readings of the dose values $D_2/D_1$.

FIG. 2 shows the dose values of the detector $D_1$ indicated in R/rem plotted over the quotient of the dose values, measured by means of detectors $D_1$ and $D_2$ of the albedo dosimeter system 7. On the assumption that the increased sensitivity of the albedo dosimeter 7 is due to backscattered neutrons not only in the thermal but also in the intermediate energy range, no correspondingly higher ratio of readings of the detectors $D_2/D_1$ is expected for an increased dosimeter sensitivity of the detector $D_1$. The fraction of intermediate neutrons increases the dosimeter sensitivity by the same margin as thermal neutrons do, but without increasing the ratio of readings $D_2/D_1$. The measured results of the $^{252}$Cf and $^{238}$Pu-Be exposures, however, show that there is a functional relationship between the dosimeter sensitivity of the detector $D_1$ and the ratio of readings of the detectors $D_2/D_1$. The deviation of the readings from a mean straight line $G_1$ is within ± 20%. The assignment by means of straight line $G_2$ of the dosimeter sensitivity of the detector $D_1$ to the corresponding ratio of readings $D_2/D_1$ is a factor of 2.5 smaller for 14 MeV neutrons. The increased dose sensitivity to the occurence of fast neutrons obviously and exclusively is due to thermal neutrons. The reading for thermal neutrons is approximately on the same straight line as the results obtained for $^{252}$Cf neutrons (ratio of readings $D_2/D_1 =$ 22). Because of these results, a first correction factor $k_1 [\delta(D_2/D_1)]$ was determined as a function relative to the ratio of readings of detectors $D_1$, $D_2$, which is shown in FIG. 3 for fast neutrons as the straight line $G_3$, and for the 14 MeV neutrons as the straight line $G_4$, and which is used for correction of the reading $D_1$ (first calibration diagram). The correction in this case turns out to be $D_n = k_1 \cdot D_1$, where $D_n$ is the reading true to the equivalent dose.

Considerable advantage has been achieved in the measurement of fast neutrons from the use of the albedo dosimeter system 7 by using the first correction factor $k_1$. Without any correction of the backscattered fraction the sensitivity of the dosimeter reading in the range of energies between 14 MeV neutrons and backscattered $^{252}$Cf neutrons is between 0.17 and 2.2 R/rem. After correction of the reading of the detector $D_1$ by means of the ratio of readings $D_2/D_1$, a mean dosimeter sensitivity of 0.54 R/rem is obtained with a maximum deviation of only ± 30%. This total error influence was determined for the directions of radiation incidence under 0°, 90° and 180°.

The over sensitivity of the albedo dosimeter system 7 to intermediate and thermal neutrons limits the application of the dosimeter in personnel monitoring to three main cases:

1. Handling of spontaneously fissioning neutrons and ($\alpha$,n)- neutron sources: Correction of the backscattered radiation fraction through $D_2/D_1$ requires no additional information about the neutron spectrum.
2. Handling 14 MeV neutrons: Again, a correction of the backscattered radiation fraction through $D_2/D_1$ is possible.
3. Control at reactors: On the basis of local dose measurements for given shielding conditions a corresponding calibration factor can be used as the basis. Evaluation of dosimeter 7 requires additional information about the neutron spectrum.

In order to be able to measure also intermediate neutrons true to the dose equivalent, albedo dosimeters have been build which include a third detector according to the present invention and are represented in FIG. 4–6.

FIG. 4 shows one embodiment in which a cylinder open on both sides and made of a neutron absorbing material, e.g., materials containing boron or lithium, or Cd, is surrounded by a plastic form 9. The interior 10 of the cylinder 8 is subdivided by two disks 11 and 12 forming two cross sectional planes. Also these two disks 11 and 12 are made of a material absorbing neutrons, such as boron. The outside surface 14 of the upper disk 11 carries the detector $D_2$, the space 15 between the two disks 11 and 12 the third detector $D_3$, and the outside surface 16 of the disk 12 facing towards the opening 13 the detector $D_1$. The third detector $D_3$ thus is completely surrounded by neutron absorbing material, while detector $D_2$ is unprotected and detector $D_1$ can be hit only by thermal neutrons energing from the body not shown in greater detail.

The whole arrangement is surrounded by the plastic form 9 which also closes the bottom opening 13 and at the same time supports the detector $D_1$ with a pan-shaped structure 17. Around the bottom opening 13 of the cylinder 8 the plastic form 9 forms an edge 18 which is placed upon the body not shown in greater detail. The outside surface 14 of the disk 11 is covered by a slide lock and bayonet catch, respectively, also made of plastic. After opening of this lock 19 the components of the albedo dosimeter 7 can be taken from the plastic form 9.

FIG. 5 shows another embodiment which has a rectangular shape in cross section. (The same reference symbols are used for the corresponding parts). Instead of the cylinder 8 with its circular cross section there is a shielding 20 made of a neutron absorbing material, e.g. boron, which has a rectangular cross section. The interior 10 again is subdivided by the two disks 11 and 12, the third detector $D_3$ being installed in the interim space 15. The outside surface 14 of the disk 11 again carries the detector $D_2$, the surface 16 of the disk 12 carries the detector $D_1$, which may be coupled with another detector $D_4$ for measurement of the gamma component of the incident radiation. The same arrangement may be made for the other detectors $D_2$ and $D_3$. The two disks 11 and 12 again are made of a neutron absorbing material.

The shielding 20, as the disks 11 and 12, are again surrounded by a plastic form 21 adapted to the cross sectional shape of the shielding 20 and the cross sectional shape, now rectangular, of the disks 11 and 12 (see FIG. 6). This plastic form 21 has an edge extending all around its circumference as shown in the arrangement according to FIG. 4, but the bottom opening 13 of the shielding 20 again is closed by the pan-shaped structure 17 which constitutes a support for detectors $D_1$ and $D_4$ and has a bottom 22 resting upon the surface of the body not shown in greater detail. This embodiment can be used for automatic evaluation, because the detectors $D_1$, $D_2$ and $D_3$, and $D_4$, respectively, can be arranged on evaluation cards.

FIG. 6 shows a view of this embodiment according to FIG. 5. In addition, it can be seen from this diagram that the plastic form 21 has two extensions 23 and 24 in which holes 25 and 26 are provided. These extensions 23, 24 and these holes 25, 26, respectively, are used for the attachment of a belt.

Evaluation and measurements, respectively, with the two albedo dosimeters 7 shown in FIGS. 4 and 5 work like this: The detector $D_1$ is used to detect dose values which correspond to the dose of the incident neutrons by measurement of the neutrons backscattered by the body, especially thermal neutrons. The detector $D_2$, which rests on the outer surface of the albedo dosimeter 7, measures the incident thermal and intermediate neutrons and, to a certain percentage, also the incident fast neutrons. The detector $D_3$, which is surrounded on all sides by neutron absorbing material, detects dose values of intermediate neutrons which may impinge upon it through the boron shielding. All the thermal neutrons are retained by the boron shielding.

In determining the equivalent dose, the dose value of the detector $D_1$ is used and corrected by means of correction factors. First of all, the first correction factor $k_1$ from the calibration diagram according to FIG. 3 is determined for it from the quotient of the dose values of the detector $D_2$ relative to the detector $D_1$ for the thermal neutron fraction. Next, another correction factor, $k_2$, is applied to it for the intermediate neutron fraction, which is a function of the quotient of the difference of two dose values of two detectors and one dose value of one of the detectors. In particular, this is the difference of the dose value of the second detector $D_2$ and the dose value of the third detector $D_3$ which is divided by the dose value of the detector $D_3$. For the correction factor $k_2$ a second calibration diagram is elaborated which approximately corresponds to the first calibration diagram according to FIG. 3 (but is not shown in more detail). The equivalent dose $D_n$ of the neutrons over the entire energy range then results from the dose value of the detector $D_1$ to which first the first correction factor $k_1$ and then the second correction factor $k_2$ is applied, or vice versa.

What we claim is:

1. Method for determining the dose value of neutrons leaving a body as thermal and intermediate neutrons after having been scattered in the body, comprising the steps of:
    detecting on the surface of the body a first dose value of thermal and intermediate neutrons leaving the body by a first detector which is shielded against thermal and intermediate neutrons not emerging from the body,
    detecting a second dose value of thermal and intermediate neutrons not emerging from the body by a second detector,
    determining a first correction value based on the first and second values from a calibration diagram, and
    applying said first correction factor to said first dose value to determine a corrected first dose value.

2. Method as claimed in claim 1 wherein the first correction factor for the dose value of the first detector is determined as a function of the quotient of the second dose value of the second detector with respect to the first dose value of the first detector.

3. Method of determining the dose value of neutrons leaving a body as thermal and intermediate neutrons after having been scattered in the body, comprising the steps of:
    detecting on the surface of the body a first dose value of thermal and intermediate neutrons leaving the body by a first detector which is shielded against thermal and intermediate neutrons not emerging from the body,
    detecting a second dose value of thermal and intermediate neutrons not emerging from the body by a second detector,
    determining a first correction value based on the first and second values from a first calibration diagram,
    detecting a third dose value by a third detector completely shielded against thermal neutrons,
    determining a second correction factor based on the second and third values from a second calibration diagram, and
    applying said first and second correction factors to said first dose value to determine a corrected first dose value.

4. Method as claimed in claim 3 wherein the first correction factor is determined as a function of the quotient of the second dose value of the second detector with respect to the first dose value of the first detector, and the second correction factor is determined as a function of the quotient of the difference between two of the dose values and one of the dose values.

5. Method as claimed in claim 4 wherein the second correction factor is determined as a function of the quotient of the difference of the second and the third dose values of the second and the third detectors and the third dose value of the third detector.

6. The method of claim 5 wherein the first correction factor is applied to the first dose value to obtain a first corrected first dose value and then the second correction factor is applied to the first corrected first dose value.

7. The method of claim 5 wherein the second correction factor is applied to the first dose value to obtain a first corrected first dose value and then the first correction factor is applied to the first corrected first dose value.

8. A device for determining the dose value of neutrons leaving a body as thermal and intermediate neutrons after having been scattered in the body comprising:
    a. a pan-shaped form having an opening which can be placed on the body and a wall having an inner surface facing toward the body and an outer surface facing away from the body,
    b. a first detector on the inner surface of said pan-shaped form for measuring thermal and intermediate neutrons emerging from the body, said first detector being shielded by said form from thermal and intermediate neutrons not emerging from the body; and
    c. a second detector on the outer surface of said pan-shaped form for measuring thermal and intermediate neutrons not emerging from the body.

9. Device as claimed in claim 8 wherein the opening is surrounded by an edge.

10. Device as claimed in claim 9 wherein the pan-shaped form and the edge are made of a material which absorbs thermal and intermediate neutrons.

11. Device as claimed in claim 10 wherein the material is boron or lithium bearing material or Cd.

12. Device as claimed in claim 8 including a gamma radiation detector arranged beside at least one of said first and second detectors.

13. A device for determining the dose value of neutrons leaving a body as thermal and intermediate neutrons after having been scattered in the body comprising:
   a. a cylinder having an open interior with the bottom of the open interior facing toward the body,
   b. first and second disks in the interior of the cylinder and arranged at a spaced distance from each other to form two cross-sectional planes in the cylinder, with said second disk being closer to the bottom of the open interior than said first disk,
   c. a first detector on the outer surface of the second disk which outer surface faces toward the body, said first detector measuring thermal and intermediate neutrons emerging from the body, said first detector being shielded against thermal and intermediate neutrons not emerging from the body, said cylinder and second disk forming a pan-shaped form,
   d. a second detector arranged on the outer surface of the first disk which outer surface faces away from the body; said second detector measuring thermal and intermediate neutrons not emerging from the body, and
   e. a third detector arranged in the space between the first and second disks, said third detector measuring intermediate neutrons and being shielded against thermal neutrons.

14. Device as claimed in claim 13 wherein the cylinder, the outer surface of the first disk, the outer surface of the second disk, and portions of the inner wall of the cylinder are encapsulated and lined with a plastic form.

15. Device as claimed in claim 14 wherein the plastic form has a support edge which surrounds said cylinder at the level of the bottom of the opening of the cylinder, said support edge having two extensions.

16. Device as claimed in claim 14 wherein the plastic form is designed as a locking mechanism in the area of the outer surface of the first disk.

17. Device as claim in claim 16 wherein the locking mechanism is designed as a bayonet catch.

18. Device as claimed in claim 16 wherein the locking mechanism is designed as a slide lock.

19. Device as claimed in claim 13 wherein the cylinder and the disks consist of a material which completely absorbs thermal neutrons and partly absorbs intermediate neutrons.

20. Device as claimed in claim 19 wherein the material is boron.

21. Device as claimed in claim 13 including a gamma radiation detector arranged beside at least one of said detectors.

* * * * *